(12) United States Patent
Graves et al.

(10) Patent No.: US 12,387,642 B2
(45) Date of Patent: Aug. 12, 2025

(54) METHOD FOR PRODUCING FLAT RIBBON STRUCTURES WITH CONTINUOUS EXTRUDED FIBERS FOR LASER PHOSPHOR DISPLAYS

(71) Applicant: Prysm Systems, Inc., Milpitas, CA (US)

(72) Inventors: Robert L. Graves, Methuen, MA (US); Philip J. Ralli, Maynard, MA (US)

(73) Assignee: Prysm Systems, Inc., Milpitas, CA (US)

( * ) Notice: Subject to any disclaimer, the term of this patent is extended or adjusted under 35 U.S.C. 154(b) by 830 days.

(21) Appl. No.: 17/652,247

(22) Filed: Feb. 23, 2022

(65) Prior Publication Data

US 2023/0267863 A1 Aug. 24, 2023

(51) Int. Cl.
| | | |
|---|---|---|
| G09G 3/02 | (2006.01) | |
| G03B 21/20 | (2006.01) | |
| G03B 21/62 | (2014.01) | |
| G03B 33/16 | (2006.01) | |
| H04N 9/31 | (2006.01) | |

(52) U.S. Cl.
CPC ............ *G09G 3/02* (2013.01); *G03B 21/204* (2013.01); *G03B 21/62* (2013.01); *G03B 33/16* (2013.01); *H04N 9/3129* (2013.01)

(58) Field of Classification Search
None
See application file for complete search history.

(56) References Cited

U.S. PATENT DOCUMENTS

| | | | |
|---|---|---|---|
| 2003/0016924 A1* | 1/2003 | Thompson | G02B 6/4482 385/114 |
| 2006/0176552 A1* | 8/2006 | Kuo | G02B 6/08 348/E5.143 |
| 2017/0219792 A1* | 8/2017 | Debban | G02B 6/4483 |

\* cited by examiner

*Primary Examiner* — Bao-Luan Q Le
*Assistant Examiner* — Danell L Owens
(74) *Attorney, Agent, or Firm* — PATTERSON + SHERIDAN, LLP; Steven H. VerSteeg

(57) ABSTRACT

The present disclosure generally relates to micro-ribbon structures used in display systems and methods of fabrication thereof. Individual fibers are made using an extrusion process whereby a core surrounded by an ink portion is extruded to create an individual fiber. The ink portion may include both an inner portion that is in contact with the core and an outer shell portion over the inner portion. The individual fibers are then bonded to adjacent fibers to create micro-ribbon structures. The micro-ribbon structures are of one color and spaced from adjacent micro-ribbon structures of a different color by a light blocking fiber. The micro-ribbon structures are each bonded to the light blocking fiber to create the color stripes used in the display system.

22 Claims, 11 Drawing Sheets

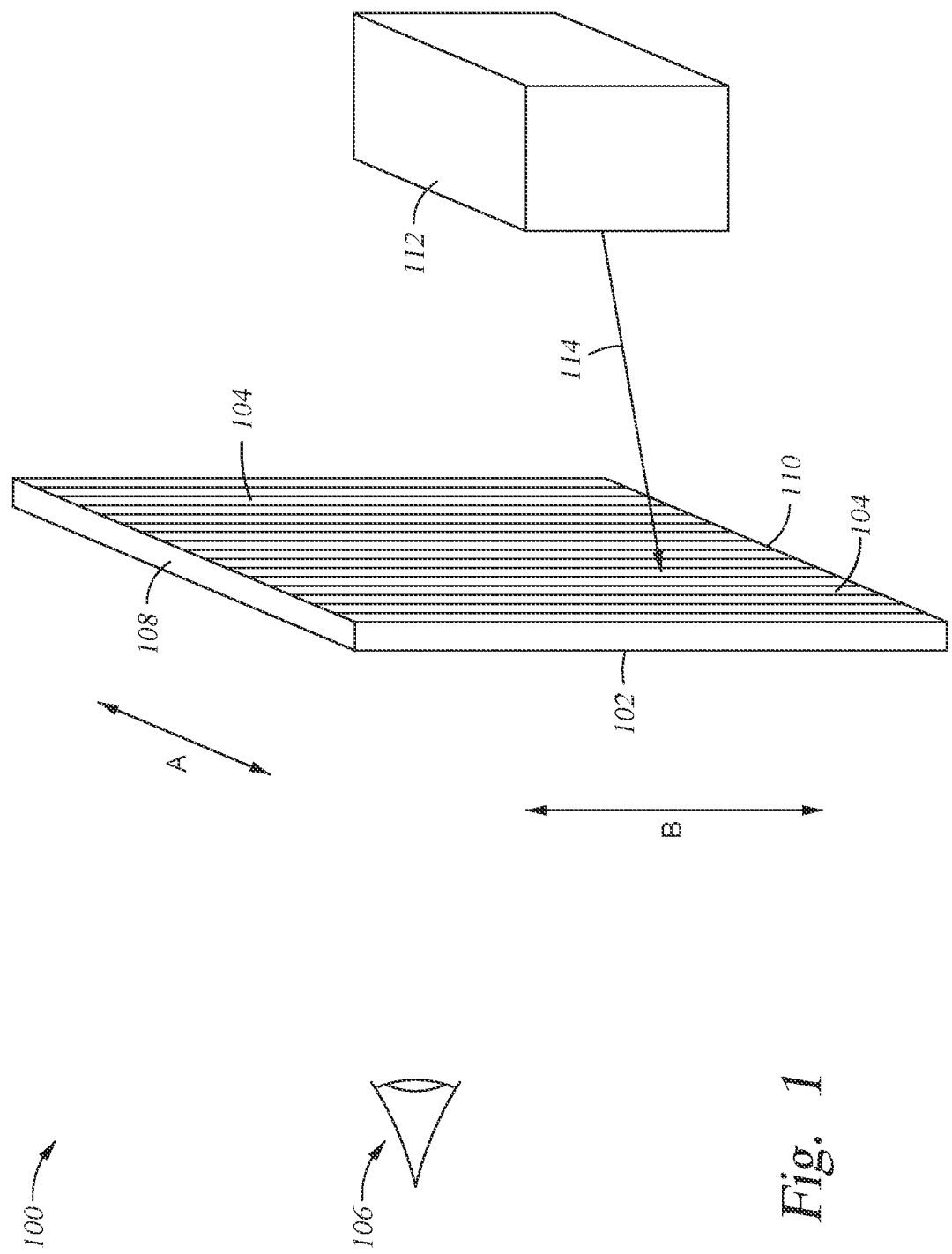

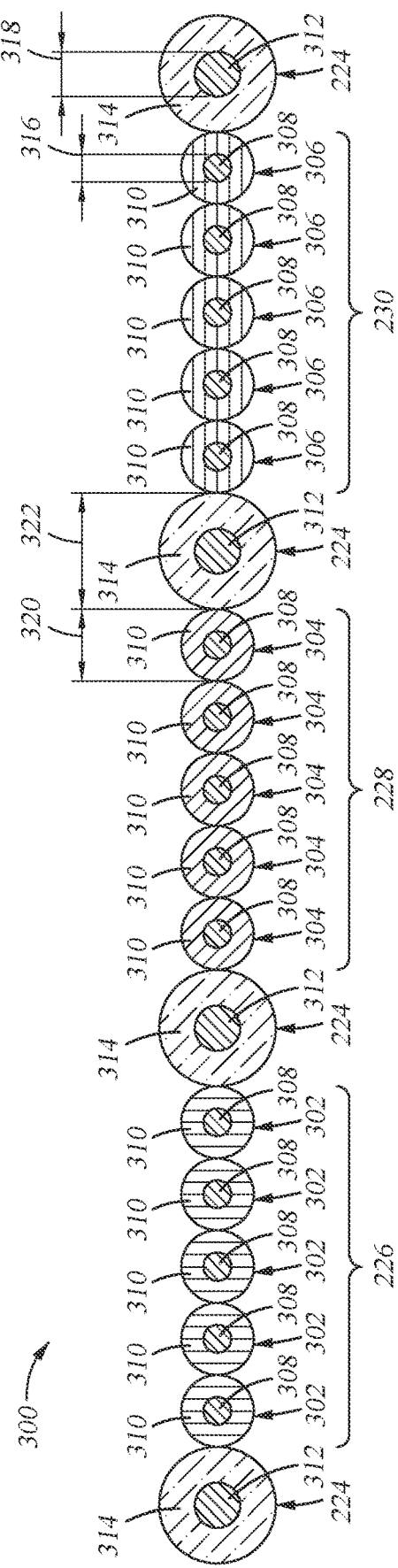
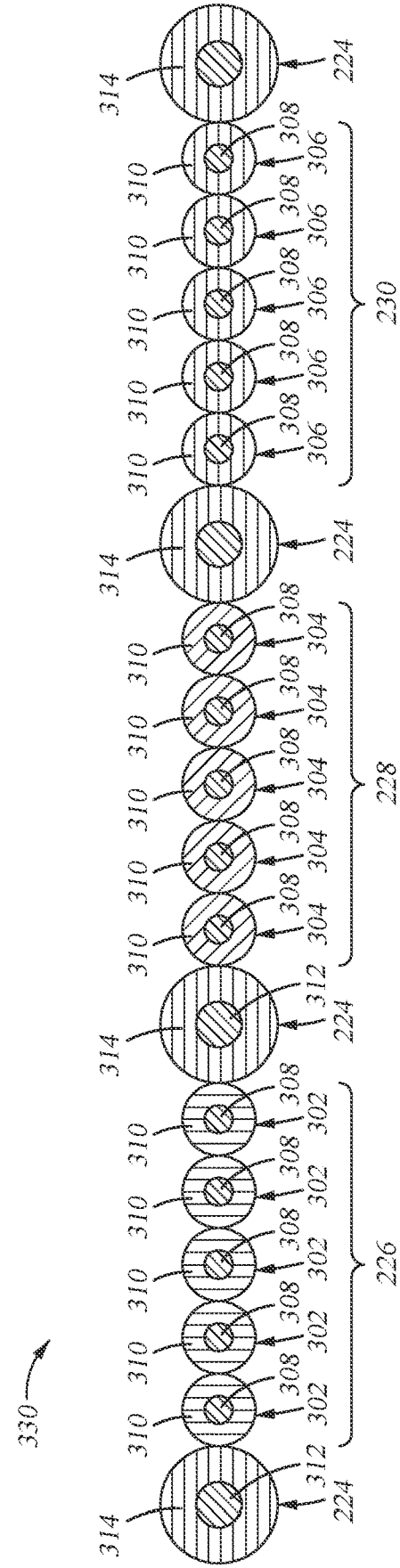
Fig. 3A
Fig. 3B

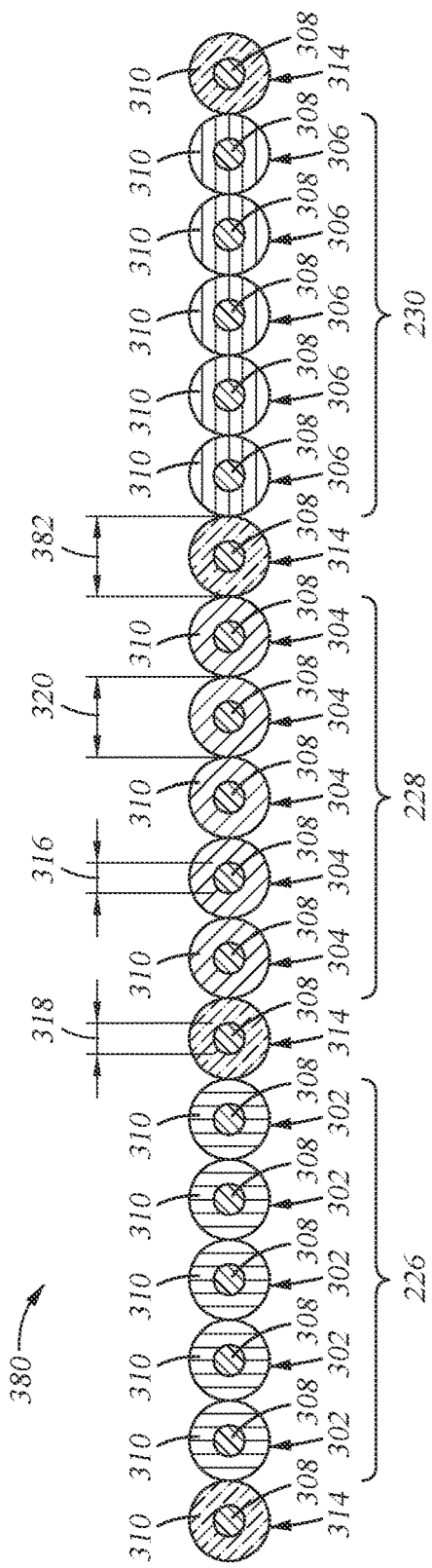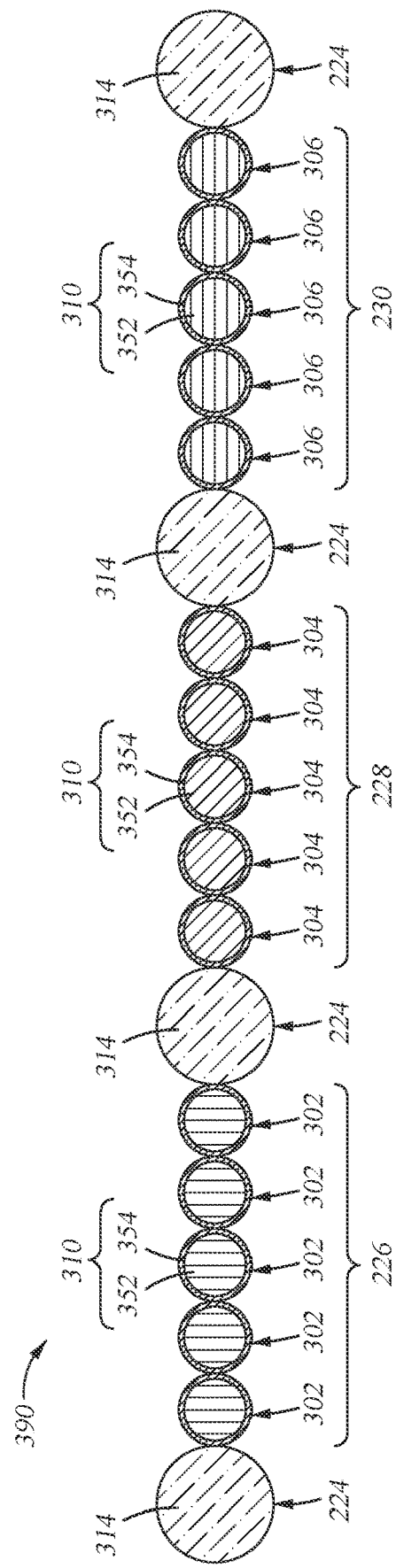
Fig. 3G
Fig. 3H

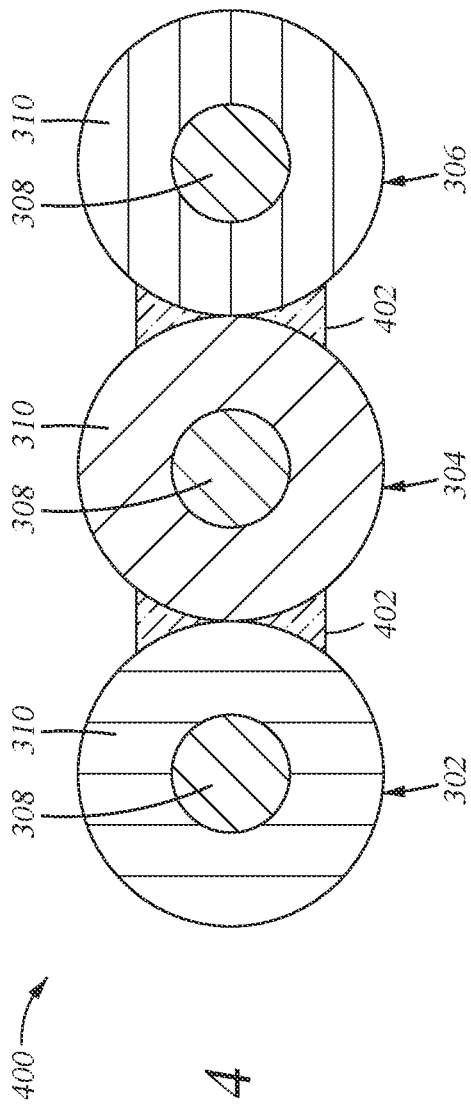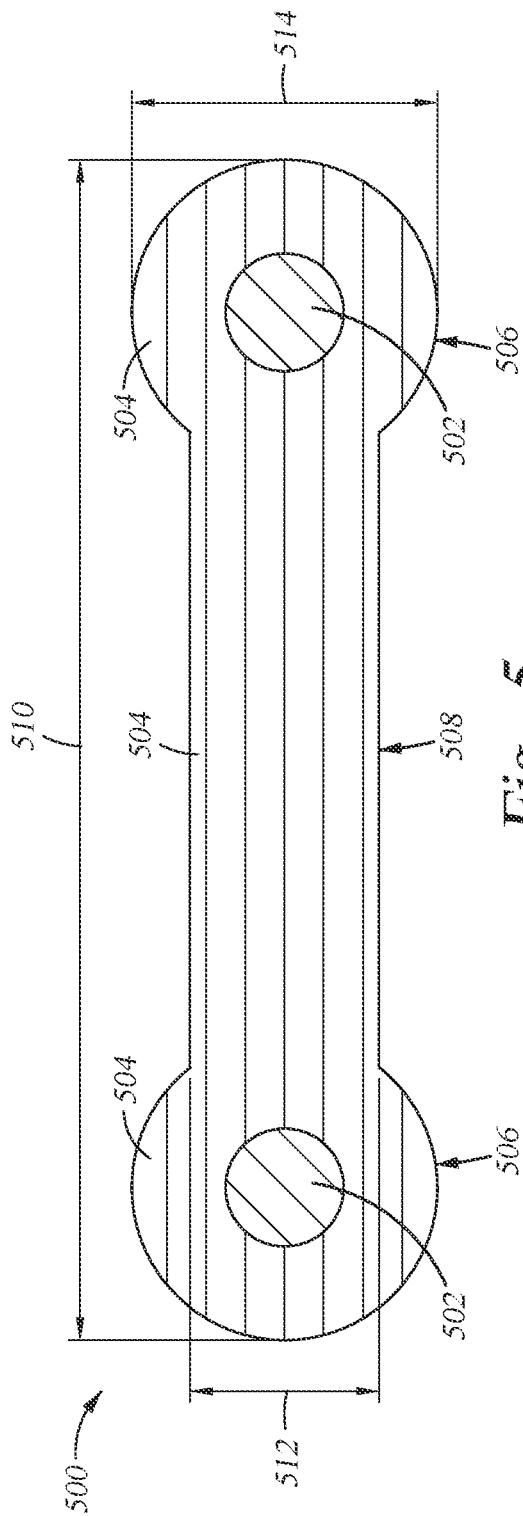

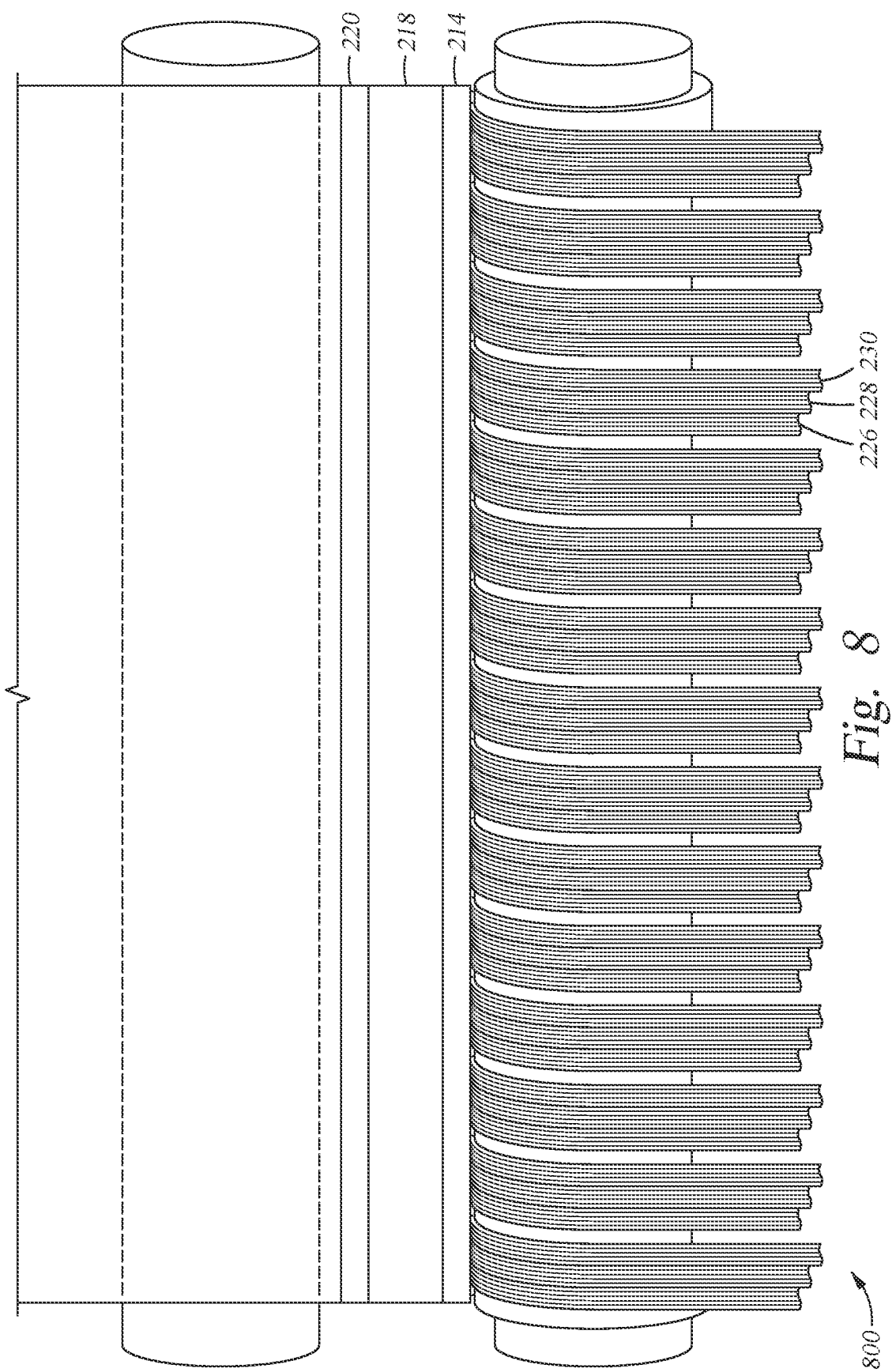

METHOD FOR PRODUCING FLAT RIBBON STRUCTURES WITH CONTINUOUS EXTRUDED FIBERS FOR LASER PHOSPHOR DISPLAYS

BACKGROUND OF THE DISCLOSURE

Field of the Disclosure

Embodiments of the present disclosure generally relate to electronic display systems.

Description of the Related Art

Electronic display systems are commonly used to display information from computers and other sources. Typical display systems range in size from small displays used in mobile devices to very large displays, such as tiled displays or panels, that are used to display large size images and video. Panel systems are generally made up of multiple smaller individual display devices that are carefully aligned when assembled to provide a seamless and uniform appearance. In some embodiments, each panel may be a light-based electronic display device, such as a laser-phosphor display (LPD), including a self-contained laser-based image-generating system.

The current method for producing image panels for LPDs is using a precision printing process that is done in sheet form. The precision printing process is limited in width and length by the printing operation. Additionally, the printing operation requires multiple steps, such as joining resulting sheets together to produce large image panels, with each step requiring precision alignment onto a substrate. The resulting discrete printed sheets require precision trimming and seaming both vertically and horizontally in order to produce the final display format.

Therefore, there is a need in the art for a more efficient and effective manner for fabricating image panels.

SUMMARY OF THE DISCLOSURE

The present disclosure generally relates to micro-ribbon structures used in display systems and methods of fabrication thereof. Individual fibers are made using an extrusion process whereby a core surrounded by an ink portion is extruded to create an individual fiber. The ink portion may include both an inner portion that is in contact with the core and an outer shell portion over the inner portion. The individual fibers are then bonded to adjacent fibers to create micro-ribbon structures. The micro-ribbon structures are of one color and spaced from adjacent micro-ribbon structures of a different color by a light blocking fiber. The micro-ribbon structures are each bonded to the light blocking fiber to create the color stripes used in the display system.

In one embodiment, a micro-ribbon structure comprises: an extruded first fiber having a first core portion and a first ink portion surrounding the first core portion; and an extruded second fiber having a second core portion and a second ink portion surrounding the second core portion, wherein the first ink portion is bonded to the second ink portion.

In another embodiment, a method of manufacturing a micro-ribbon structure comprises: extruding a first micro-ribbon, wherein the first micro-ribbon comprises a first core portion and a first ink portion surrounding the first core portion, wherein the first ink portion comprises a first inner portion contacting the first core and a first outer portion; extruding a second micro-ribbon, wherein the second micro-ribbon comprises a second core portion and a second ink portion surrounding the second core portion, wherein the second ink portion comprises a second inner portion contacting the second core and a second outer portion; and bond the first micro-ribbon to the second micro-ribbon.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 is a perspective schematic diagram of a display system, according to certain embodiments.

FIGS. 3A-3H are schematic illustration of micro-ribbons according to various embodiments.

FIG. 4 is a schematic illustration of a micro-ribbon according to another embodiment.

FIG. 5 is a schematic illustration of a micro-ribbon according to another embodiment.

FIG. 8 is a schematic illustration of a lamination process according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 2A:
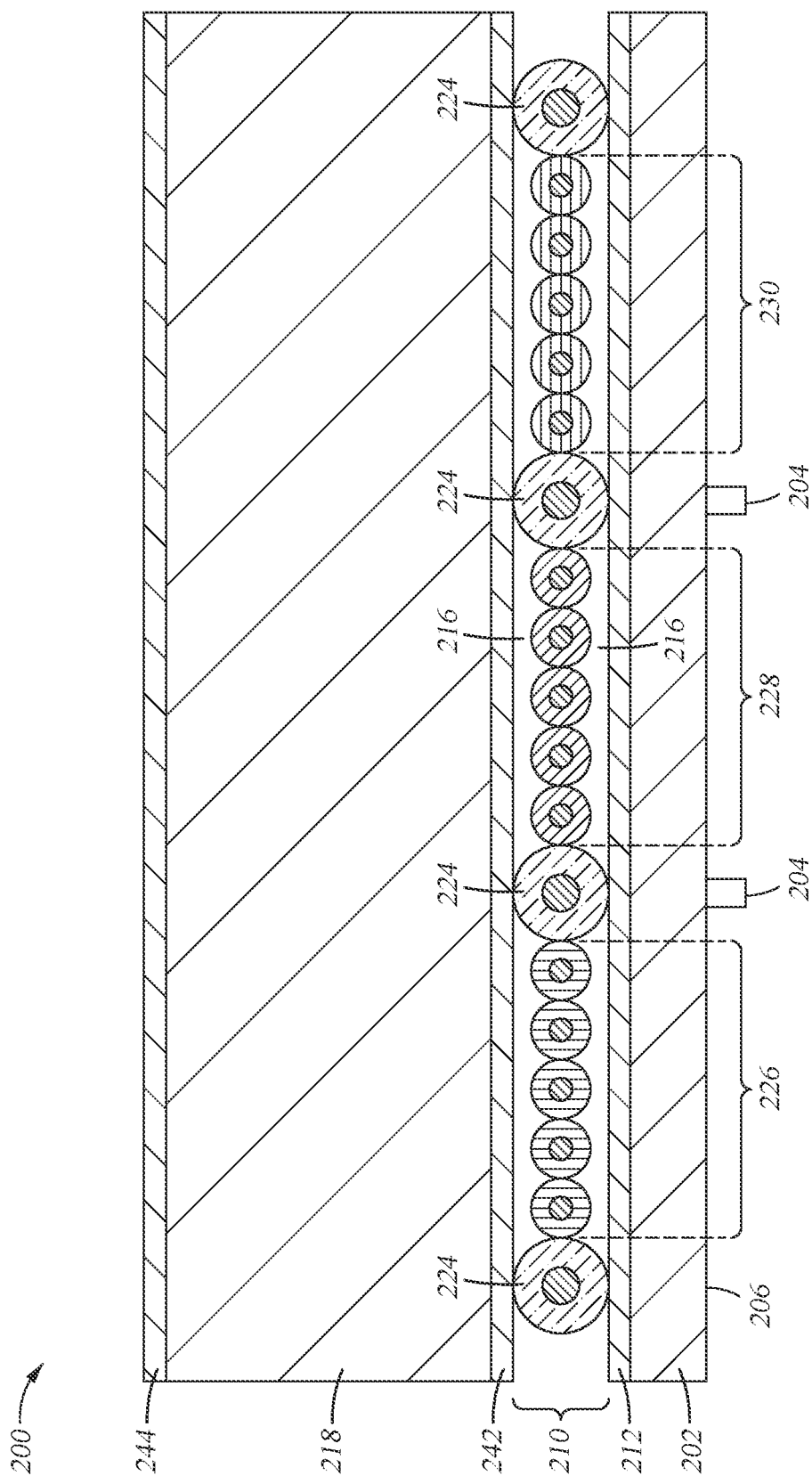
FIGS. 2A and 2B are cross-sectional illustrations of a panel according to various embodiments.

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to micro-ribbon structures used in display systems and methods of fabrication thereof. Individual fibers are made using an extrusion process whereby a core surrounded by an ink portion is extruded to create an individual fiber. The ink portion may include both an inner portion that is in contact with the core and an outer shell portion over the inner portion. The individual fibers are then bonded to adjacent fibers to create micro-ribbon structures. The micro-ribbon structures are of one color and spaced from adjacent micro-ribbon structures of a different color by a light blocking fiber. The micro-ribbon structures are each bonded to the light blocking fiber to create the color stripes used in the display system.

The individual fibers are produced by continuously extruding the fibers and then joining the fibers together in a continuous process to produce micro-ribbons with light breaks between colors. Hence, the embodiments discussed herein allow for the creation of micro-ribbons, which may be referred to as phosphor stripes, in a continuous process by first producing the individual phosphor fibers and then joining the fibers together to make the micro-ribbons and sheets. The micro-ribbons will comprise one or more individual stripes of each color and may or may not contain light blocking stripes or elements between each color. As an example, one stripe may contain five identical color fibers joined together. Multiple fibers of the same color joined together allows for the option of creating a wide aspect ratio for each color while still maintaining the desired round extrusion shape for each fiber. It is to be understood that the number of fibers joined together is not limited to five, but rather, the number of fibers may be any number of fibers sufficient to create a particular width aspect ratio. The stripe would then be joined with the other two colored stripes with a light blocking element in between each color to produce a full pixel width micro-ribbon. Each micro-ribbon can then be joined to other micro-ribbons to produce a continuous sheet. The wide micro-ribbon sheets can then be laminated to a Color Mirror film ("CM") (e.g. 3M™ UV transmittance, visible light reflector) to produce rolls of RGB/CM film. The process improves registration over a multi-pass printing process, produces continuous rolls of product for production of RGB sheets, and can be significantly long, by being restricted in length to the length the rolled sheet, to reduce a number of seamed panels for a wall size display. Improving registration is understood to mean improving alignment accuracy between layers, which is beneficial due to misalignment that may normally occur during a multi-pass printing process.

FIG. 1 is a perspective schematic diagram of a display system 100, according to certain embodiments. Display system 100 is a light-based electronic display device configured to produce video and static images for a viewer 106. The display system 100 includes light-emitting phosphors 104 disposed between two planes. For example, display system 100 may be a Laser Phosphor Display ("LPD") or other phosphor-based display device. While shown as a single image panel 102 in FIG. 1, it is to be understood that the image panel 102 may include a plurality of image panels seamlessly coupled together. For example, the image panel 102 may comprise one or more protective front plane panels and one or more image panel portions with a plurality of phosphors 104 coupled therebetween. FIG. 1 shows a plurality of phosphors 104 extending from the top 108 of the image panel 102 to the bottom 110 of the image panel 102.

The display system 100 includes a light source 112, such as a laser module, that is used to produce one or more scanning light beams 114, such as laser beams, to excite the phosphors 104 in image panel 102. The phosphors 104 are stripes that are made up of alternating phosphor material of different colors, e.g., red, green, and blue, where the colors are selected so that they can be combined to form white light and other colors of light. Scanning light beam 114 is a modulated light beam that includes optical pulse width and/or amplitude variable pulses that carry image information and is scanned across image panel 102 along two orthogonal directions, e.g., horizontally (parallel to arrow A) and vertically (parallel to arrow B), in a raster scanning pattern to produce an image on image panel 102 for viewer 106. In some embodiments, scanning light beam 114 includes visible lasers beams of one or more colors that discretely illuminate individual subpixels of the phosphors 104 to produce an image. The scanning light beam 114 can be of a specific width and height, so as to excite only a specific phosphor 104 or group of phosphors 104 at one time, such as a scanning laser beam, which is approximately 700 μm tall and approximately 100 μm wide. A feedback control alignment mechanism can be provided in the display system 100 to maintain proper alignment of the scanning beam 114 on the desired sub-pixel to achieved desired image quality.

FIG. 2A is a cross-sectional illustration of a panel 200 according to one embodiment. The panel 200 includes a color filter/mirror film (CM) 202. In one embodiment the CM 202 may comprise a 3 M UV transmittance film, a visible light reflector film, or the like. One or more Lambertian servo lines 204 may be present on a first side 206 of the CM 202. The panel 200 additionally includes a first anti-glare hard coating 242 which may comprise a particle-filled ultraviolet cured hard coating made from an acrylate or a modified acrylate. The anti-glare hard coating 242 may be formed by a spray coating process. A ribbon structure 210 or micro-ribbon is sandwiched between the CM 202 and the first anti-glare hard coating 242. A first pressure sensitive adhesive layer 212 is used to adhere the ribbon structure 210 to the CM 202. Suitable pressure sensitive adhesives include ultraviolet cured adhesive that is optically clear. In the embodiment shown in FIG. 2A, air gaps 216 are present between at least part of the ribbon structure 210 and the CM 202. Additionally, air gaps 216 are also present between at least part of the ribbon structure 210 and the first anti-glare hard coating 242. The air gaps 216 create a non-touching physical spacing between the ribbon portions described below and the CM 202 to increase brightness in the panel 200.

A blocking layer 218 is disposed on the first anti-glare coating 242. In one embodiment, the blocking layer 218 comprises polyethylene terephthalate (PET) and is configured to block light at the 405 nm wavelength. Other suitable materials for the blocking layer 218 include BASF Carbo-Protect® or red-light shifted UV absorbers. More specifically, the blocking layer 218 may comprise a custom tinted rigid front plane with 405 nm laser blocking dye. A second anti-glare hard coating 244 is also present and coupled to the blocking layer 218. The second anti-glare hard coating 244 may comprise a particle-filled ultraviolet cured hard coating such as an acrylate or modified acrylate.

Referring back to the ribbon structure 210, the ribbon structure 210 includes light blocking fibers 224, a first ribbon portion 226, a second ribbon portion 228, and a third ribbon portion 230. Each ribbon portion 226, 228, 230 represents a distinct color (i.e., red, green, or blue). The ribbon portions 226, 228, 230, also referred to as micro-ribbons, are multiple extruded fibers joined together with a thermoplastic or cross-linked adhesive or coating. A thermoplastic is known to be a polymer that can be melted, and cross-linking is a known process to join multiple polymer chains together to increase the molecular weight of the polymer. The distinct ribbon portions 226, 228, 230 are separated by one or more light blocking fibers 224. The light blocking fibers 224 are aligned in the "Y" direction with the Lambertian servo lines 204. The fibers 224 are long, continuous strings that are produced by extruding the core out of a die of a predetermined shape. In the example of FIG. 2A, the shape is a circular shape, but it is to be understood that other shapes are contemplated. The light blocking fibers 224 prevent cross-talk between adjacent ribbon portions 226, 228, 230 and increases the color gamut.

The ribbon portions 226, 228, 230 repeat in order such that a second ribbon portion 228 is always between a first ribbon portion 226 and a third ribbon portion 230, unless the second ribbon portion is at the end of the panel 200. Similarly, a first ribbon portion 228 is always between a second ribbon portion 228 and a third ribbon portion 230, unless the first ribbon portion is at the end of the panel 200. Finally, a third ribbon portion 230 is always between a first ribbon portion 226 and a second ribbon portion 228, unless the third ribbon portion 230 is at the end of the panel 200. With such an arrangement, the ribbon structure 210 has a red-green-blue alternating structure.

Figure 2B:
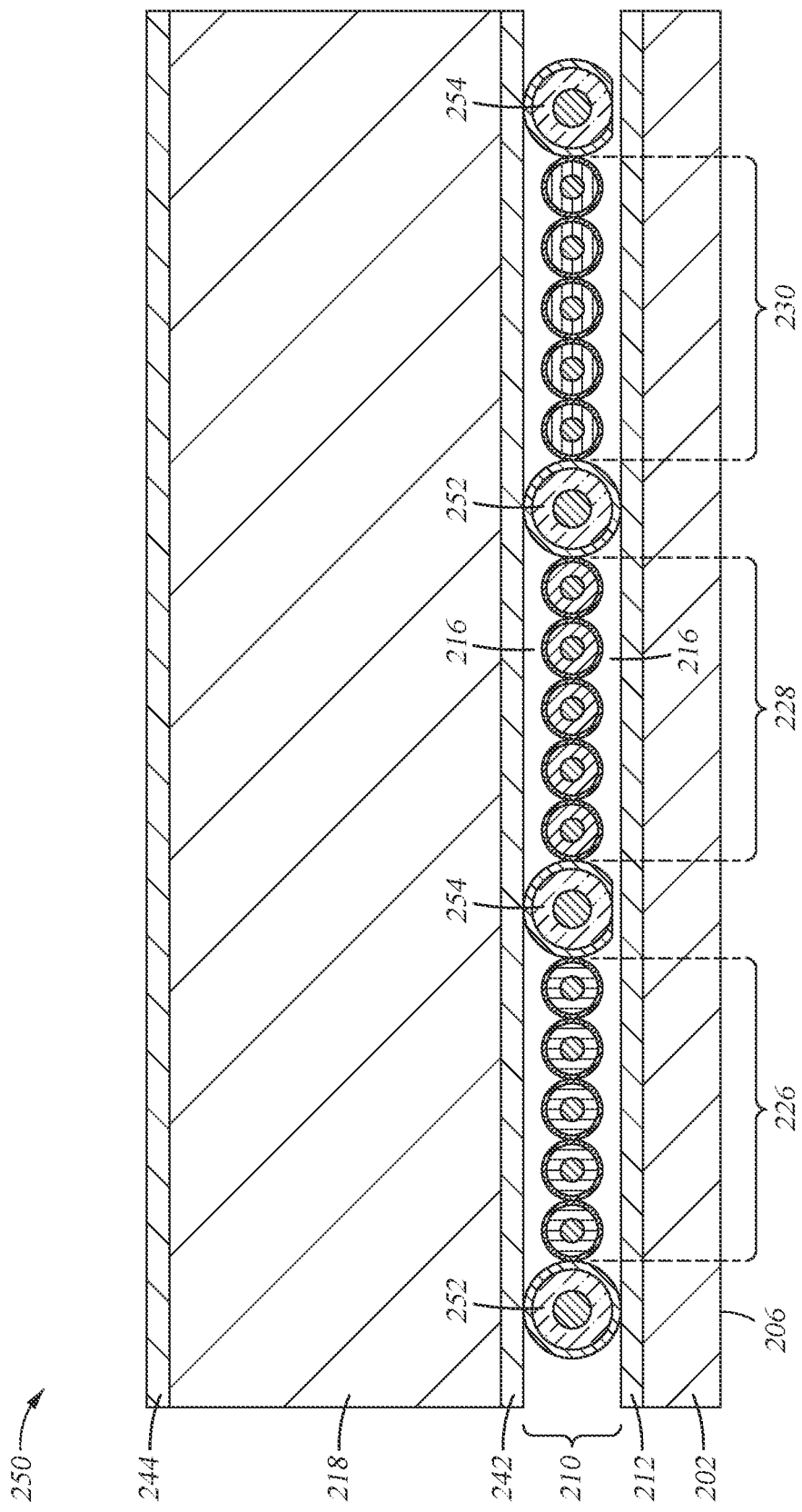

FIG. 2B is a cross-sectional illustration of a panel 250 according to one embodiment. Panel 250 is similar to panel 200 except that the ribbon structure 210 is different and the Lambertian servo lines 204 are not present. The ribbon structure 210 is different in that the fibers 224 are replaced with fibers 252, 254. Fibers 252, as will be discussed below, have a white pigment portion in an otherwise clear transparent fiber and a black outer shell. Fibers 254, on the other hand, have a white pigment portion, and a partial black outer shell. Fibers 254 perform the same function as the Lambertian servo lines 204. During fabrication, or more specifically, when extruded, fibers 252, 254 are identical as both contain an identical pigment portion and outer shell. A Lambertian servo pattern is created by partially removing the outer shell of fibers 254 to expose the pigment portion. The removing may be performed by mechanical or laser ablation. Also during fabrication, the black outer shell is co-extruded with the white pigment portion so that the pigment within the fiber 252, 254 is white while the outer shell is black.

Figure 3C:
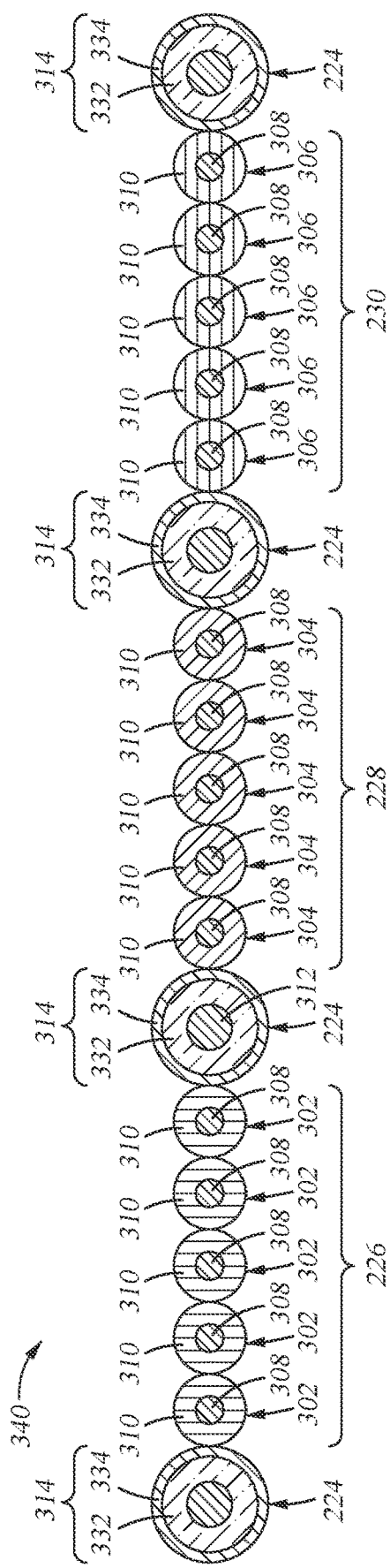

FIGS. 3A-3H are schematic illustration of micro-ribbons according to various embodiments. FIG. 3A illustrates a micro-ribbon 300 having three ribbon portions 226, 228, 230 separated from each other by a light blocking fiber 224. Ribbon portion 226 comprises five color fibers 302, ribbon portion 228 comprises five color fibers 304, and ribbon portion 230 comprises five color fibers 306. It is to be understood that while five fibers 302, 304, 306 have been shown for each ribbon portion 226, 228, 230, more or less color fibers 302, 304, 306 may be present.

Each fiber 302, 304, 306 includes a core portion 308 and an ink portion 310. As will be discussed below, the ink portion 310 may comprise a pigment portion and an outer shell. The pigment portion may comprise quantum dots or phosphor material. Similarly, each blocking fiber 224 comprises a blocking core portion 312 and a blocking ink portion 314. As will be described below, the blocking ink portion 314 may comprise a pigment portion and an outer shell. In the embodiment shown in FIG. 3A, the core portion 308 has a first diameter 316 and the blocking core portion 312 has a second diameter 318. In the embodiment of FIG. 3A, the first diameter 316 is equal to the second diameter 318. Similarly, each ink portion 310 has a third diameter 320 and each blocking ink portion 314 has a fourth diameter 322. As shown in FIG. 3A, the third diameter 320 is less than the fourth diameter 322. Because the fourth diameter 322 is greater than the third diameter 320, the air gaps 216 will be present in the panel 200. In one embodiment, the first diameter 316 and the second diameter 318 are between about 9 microns and about 62.5 microns, such as about 50 microns. In one embodiment, the third diameter 320 is between about 50 microns and about 80 microns, such as about 75 microns while the fourth diameter is between about 75 microns and about 100 microns.

Suitable materials for the core portion 308 and the blocking core portion 312 include glass fiber, reflective metal, polymer fiber, carbon, nylon, polyester, any strong and clear polymer fiber material, and combinations thereof. The ribbon portions 226, 228, 230 can each have a length of between about 300 nm and about 500 nm, such as about 450 nm. The ink portions 310 may include a phosphor filled thermoplastic resin such as DYNEON® THV resin. In the embodiment shown in FIG. 3A, the blocking ink portion 314 has a black pigment whereas the first ribbon portion 226 has red pigment for the ink portions 310, the second ribbon portion 228 has green pigment for the ink portions 310, and the third ribbon portion 230 has blue pigment for the ink portions 310.

In operation, light from a light source will be directed through the ink portions 310. The core portions 308 are sufficiently small in diameter to noticeably block any light. Hence, any gaps due to the core portion 308 would be sufficiently small as to be unrecognizable. Thus, any gaps between the colors due to the core portions 308 would not be visible. The blocking ink portions 314 as well as the Lambertian servo lines 204 are sufficient to block light, yet sufficiently small to prevent gaps between and within the ribbon portions 226, 228, 230 from being visible to the viewer during device operation.

FIG. 3B is similar to FIG. 3A, except that the blocking ink portion 314 of micro-ribbon 330 is ambient colored rather than black. The micro-ribbon 340 in FIG. 3C comprises a white pigment portion 332 in the blocking ink portion 314 together with an outer shell 334. The white pigment portion 332 together with the black outer shell 334 function as a Lambertian servo. The outer shell 334 is either laser or mechanically ablated to create the Lambertian pattern. As seen in FIG. 3C, after the ablation, portions of the pigment portion 332 are exposed as the outer shell 334 no longer completely encompasses the pigment portion 332. An outer shell can be a thermoplastic material (i.e., a co-extruded polymer around the pigment portion that can be used to bond or join the fibers together or also a color correction for the ink portion).

Figure 3D:
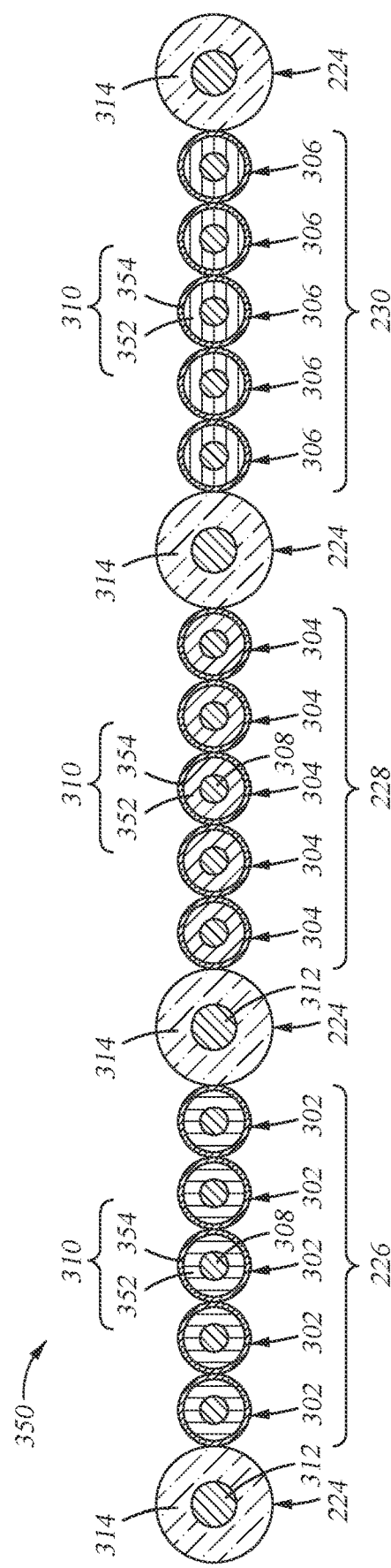
Figure 3E:
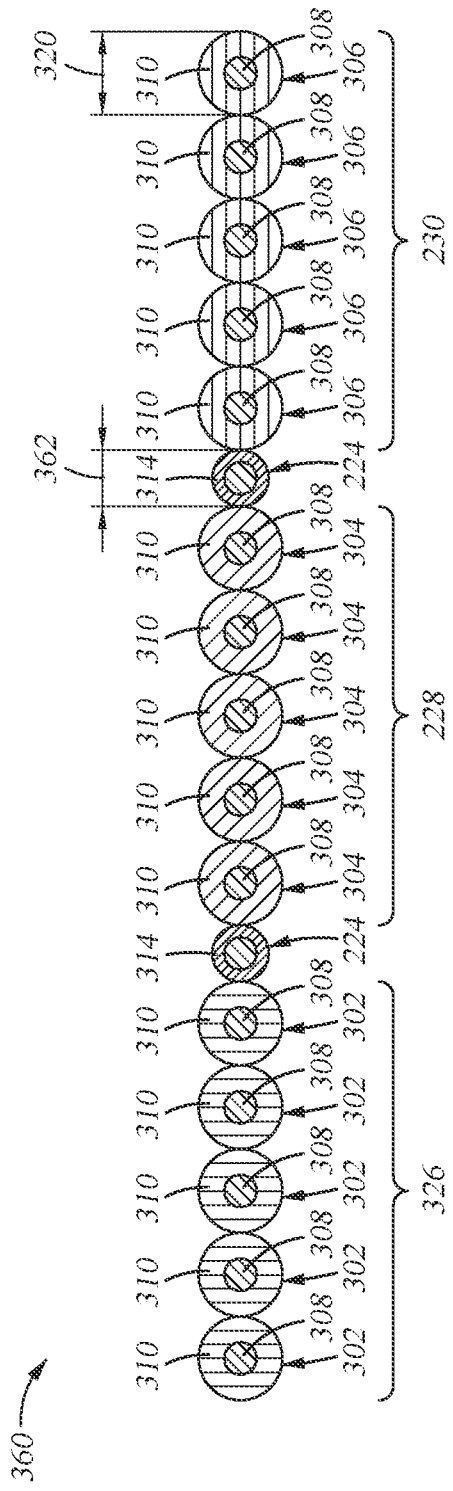
Figure 3F:
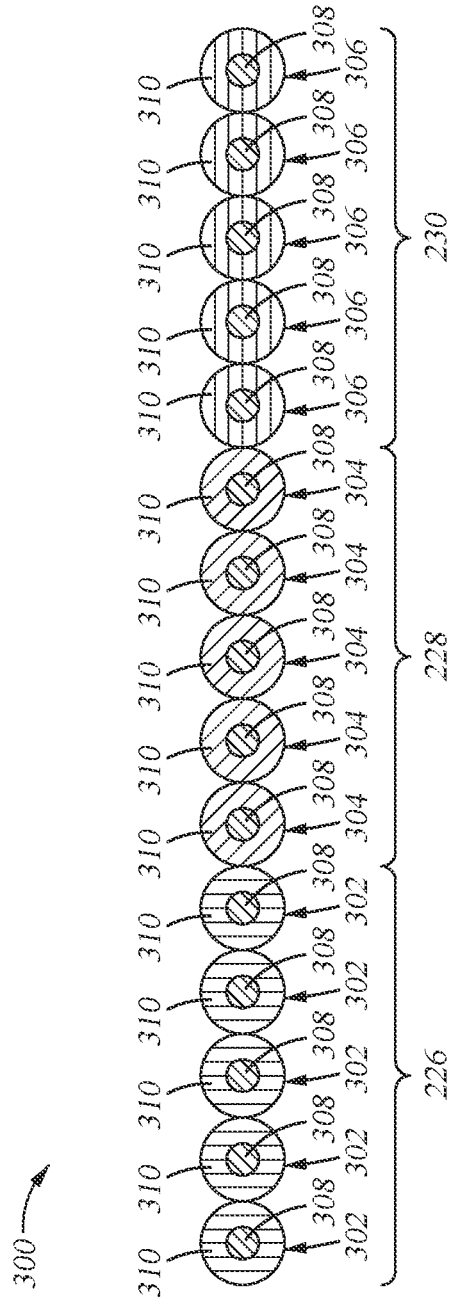

In FIG. 3D, not only are outer shells 334 of the blocking ink portion 314 of the micro-ribbon 350 present, but the ink portions 310 for each fiber 302, 304, 306 includes a pigment portion 352 as well as an outer shell 354. The outer shells 354 function as color correctors over the pigment portions 352 to correct ambient and/or phosphor emissions. The outer shells 354 can be clear and/or use a different thermoplastic resin for improving bonding of the fibers 302, 304, 306. In FIG. 3E, the blocking ink portion 314 of the micro-ribbon 360 has a smaller diameter 362 as compared to the diameter 320 of the ink portion 310 of the fibers 302, 304, 306 in order to reduce spacing between adjacent ribbon portions 226, 228, 230. In FIG. 3E, the diameter 318 of the blocking core portion 312 is equal to the diameter 316 of the core portion 310 of each fiber 302, 304, 306. In FIG. 3F, the blocking fiber 224 is eliminated from the micro-ribbon 370 so that the ribbon portions 226, 228, 230 are adjacent one another. In FIG. 3G, the blocking fiber 224 is present in the micro-ribbon 380, but the blocking ink portion 314 of the micro-ribbon 380 has a larger diameter 382 as compared to the diameter 320 of the ink portion 310 of the fibers 302, 304, 306 in order to reduce spacing between ribbon portions 226, 228, 230. In FIG. 3G, the diameter 318 of the blocking core portion 312 is equal to the diameter 316 of the core portion 310 of each fiber 302, 304, 306. In FIG. 3H, the blocking core portion 312 and the core portion 310 are not present.

FIG. 4 is a schematic illustration of a micro-ribbon 400 according to another embodiment. Individual fibers 302, 304, 306 are joined together by a light blocking adhesive 402, such as carbon black filled ultraviolet curable resin, rather than by a blocking fiber 224. Additionally, in FIG. 4, rather than having ribbon portions 226, 228, 230, different color fibers 302, 304, 306 are adjacent one another and bonded together by the light blocking adhesive 402. Each color fiber 302, 304, 306 represents a distinct color (i.e., red, green, or blue). The light blocking adhesive 402 is aligned in the "Y" direction with the Lambertian servo lines 204.

The color fibers 302, 304, 306 repeat in order such that red fiber is between a blue fiber and a green fiber while a green fiber is between a blue fiber and a red fiber, and a blue fiber is between a red fiber and a green fiber. It is to be understood that other color orders are contemplated. With such an arrangement, the micro-ribbon 400 has a red-green-blue alternating structure. It is to be understood that the light blocking adhesive 402 may be used in any of FIGS. 3A-3E and 3H as a replacement for the blocking fiber 224 and hence.

FIG. 5 is a schematic illustration of a micro-ribbon 500 according to another embodiment. The micro-ribbon 500 includes two core portions 502 that are surrounded by and connected by an ink portion 504 to create a dog-bone like structure. The two ends 506 of the micro-ribbon 500 have a width 514 of between about 70 microns and about 100 microns such as about 75 microns. The middle portion 508 that connects the two ends 506 has a width 512 of between about 40 microns and about 60 microns, such as about 50 microns. The total length 510 of the micro-ribbon 500 is between about 300 microns and about 500 microns, such as about 340 microns. Hence, the middle portion 508 connecting the ends 506 has a length of between about 220 microns to about 380 microns. The entire micro-ribbon 500 will utilize the same color for the ink portion 504. It is to be understood that the shape of the micro-ribbon 500 can be changed to accommodate any desired shape for the micro-ribbon 500.

It is to be understood that the different embodiments shown in FIGS. 3A-3H, 4, and 5 may be combined. For example, outer shells may be present in any of the embodiments. Similarly, white pigment or ambient pigment may be used for any embodiment for the blocking fibers 224. Additionally, the ablating shown in FIG. 3C may be applicable to any of FIGS. 3A-3H, and the different diameter sizes for the blocking fibers 224 (i.e., shown in FIGS. 3A, 3E, 3G, and 3H) may be used in any embodiment utilizing a blocking fiber 224.

Figure 6:
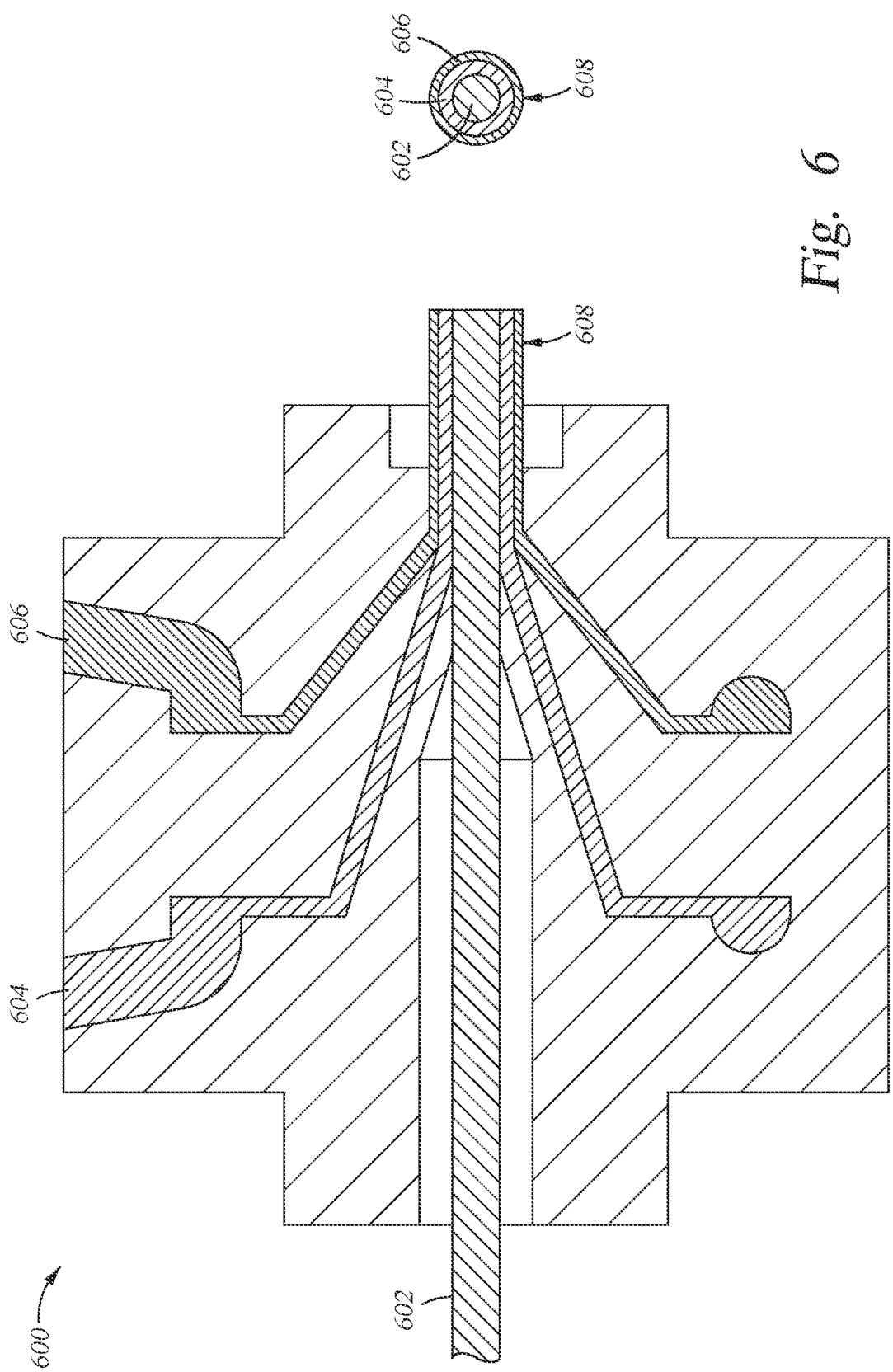
FIG. 6 is a schematic illustration of extruding a fiber according to one embodiment.

FIG. 6 is a schematic illustration of extruding a fiber 608 according to one embodiment. The core 602 of the fiber 608 is fed or pulled through the extruder 600 while the pigment portion 604 and outer shell 606 are disposed over the core 602. As the core 602, pigment portion 604, and outer shell 606 are all extruded together, the process may be referred to as a co-extrusion process. After the extrusion process, the individual fibers 608 are assembled into micro-ribbons and a micro-ribbon structure. Following assembly and bonding, the fiber 608 is then cooled, if a thermoplastic resin binder is used, or cured with UV light, if UV curable monomer binder is used, to produce the continuous fiber 608.

The pigment portion 604 is formulated with either a thermoplastic resin binder or a UV curable monomer binder. A UV resin binder does not require a heated extrusion die and also can be compounded at room temperature rather than being pelletized. Hence, there are some manufacturing advantages to using a UV curable monomer binder rather than a thermoplastic resin binder. The pigment portion 604 can be multiple layers extruded into the core 602 using a precision metering pump to control the thickness and diameter of the fiber 608.

Figure 7:
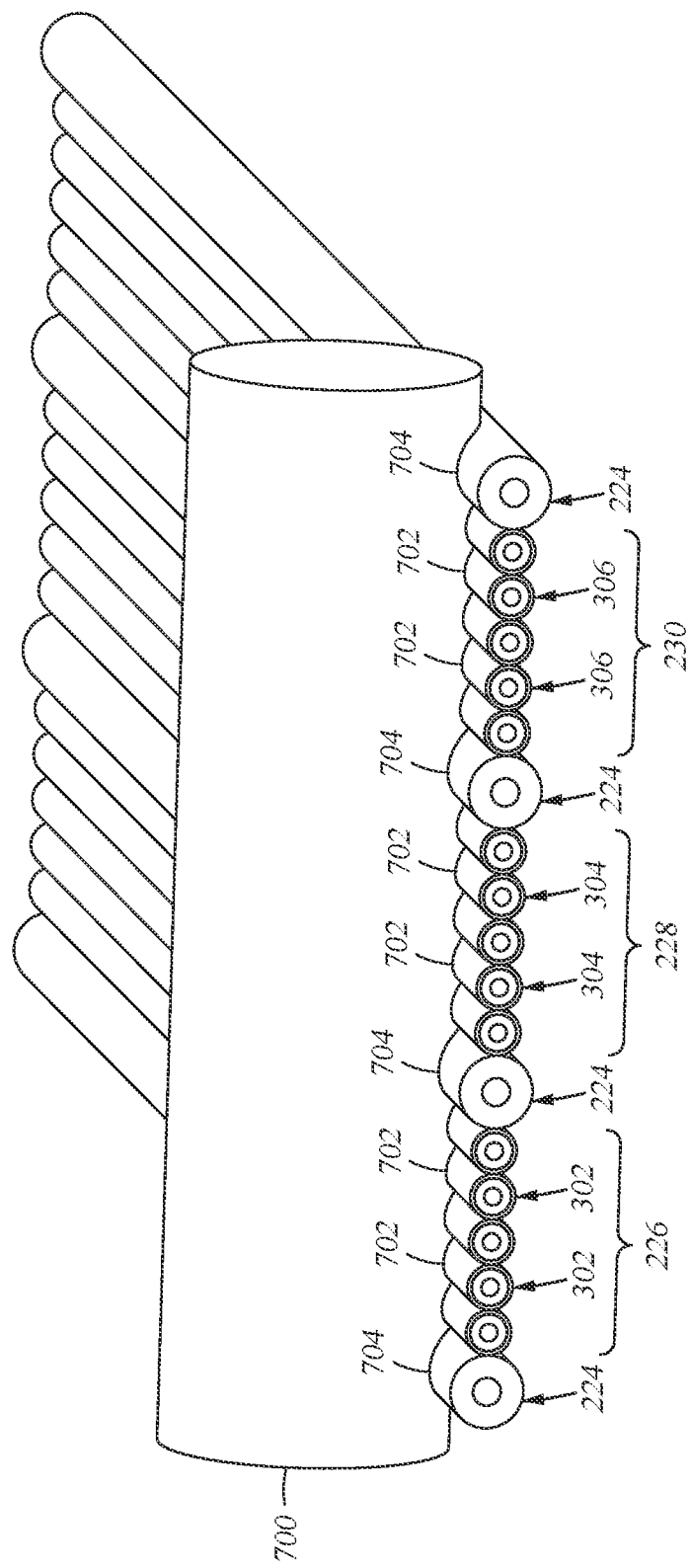
FIG. 7 is a schematic illustration of bonding fibers together to create multiple micro-ribbons according to one embodiment.

FIG. 7 is a schematic illustration of bonding fibers together to create multiple micro-ribbons according to one embodiment. Once the fibers are created, the extruded fibers are aligned using a precision grooved roller 700 or tooling such as a fine comb tool. In one embodiment, the fibers are bonded together under heat to bond the individual fibers together using the outer shells 354. The bonding can be done at a temperature that is above the melting point of the outer shell 354. Thereafter, the resulting structure can be cooled to solidify the outer shells 354 to hold the fibers together and creating the red-green-blue sections.

FIG. 8 is a schematic illustration of a lamination process according to one embodiment. Once the micro-ribbons are created, the micro-ribbons are laminated with the CM film and remaining layers to create the panel 200. The various layers are laminated together using a continuous roll-to-roll lamination system 800. In one example, the CM film has a thickness of between about 70 microns and about 100 microns such as about 75 microns; the pressure sensitive adhesive has a thickness of between about 30 microns and about 40 microns such as about 37 microns, and the blocking layer has a thickness of between about 100 microns and about 150 microns such as about 125 microns. Thus, the laminate structure of the CM, pressure sensitive adhesive, and blocking layer is between about 200 microns and about 250 microns.

By extruding fibers and then bonding the extruded fibers to create micro-ribbon structures used in display systems, a more efficient and effective manner for fabricating image panels is achieved.

In one embodiment, a micro-ribbon structure comprises: an extruded first fiber having a first core portion and a first ink portion surrounding the first core portion; and an extruded second fiber having a second core portion and a second ink portion surrounding the second core portion, wherein the first ink portion is bonded to the second ink portion. The micro-ribbon structure further comprises an extruded light blocking fiber having a blocking core and a blocking ink portion, wherein the blocking ink portion is bonded to the second ink portion. The extruded first fiber has first diameter, wherein the extruded light blocking fiber has a blocking diameter, and wherein the first diameter and the blocking diameter are different. The first diameter is greater than the blocking diameter. The first ink portion has a first diameter, wherein the blocking ink portion has a blocking ink diameter, and wherein the first diameter and the blocking ink diameter are different. The first diameter is greater than the blocking ink diameter. The first diameter is less than the blocking ink diameter. The first ink portion includes a first inner portion contacting the first core portion and a first shell portion surrounding the first inner portion, and wherein the second ink portion includes a second inner portion contacting the second core portion and a second shell portion surrounding the second inner portion. The first shell portion is bonded to the second shell portion. The first core portion comprises glass, metal, or polymer. The first ink portion is bonded to the second ink portion by a light blocking adhesive.

A display apparatus comprising the micro-ribbon structure is also disclosed, wherein the micro-ribbon structure is a first micro-ribbon structure. The display apparatus further comprises a second micro-ribbon structure comprising: an extruded third fiber having a third core portion and a third ink portion surrounding the third core portion. The display apparatus further comprises an extruded fourth fiber having a fourth core portion and a fourth ink portion surrounding the fourth core portion, wherein the third ink portion is bonded to the fourth ink portion, wherein the first ink portion and the second ink portion comprise a first color, wherein the third ink portion and the fourth ink portion comprise a second color, and wherein the first color is different from the second color. The display apparatus further comprises a light blocking fiber having a light blocking core and a light blocking ink portion surrounding the light blocking core, wherein the first ink portion and the third ink portion are each bonded to the light blocking ink portion. The display apparatus further comprises a first pressure sensitive adhesive and a second pressure sensitive adhesive, wherein the first micro-ribbon structure, the second micro-ribbon structure, and the light blocking fiber are sandwiched between the first pressure sensitive adhesive and the second pressure sensitive adhesive. The light blocking fiber is in contact with the first pressure sensitive adhesive and the second pressure sensitive adhesive, and wherein the first micro-ribbon structure and the second micro-ribbon structure are each spaced from the first pressure sensitive adhesive and the second pressure sensitive adhesive by air gaps.

In another embodiment, a method of manufacturing a micro-ribbon structure comprises: extruding a first micro-ribbon, wherein the first micro-ribbon comprises a first core portion and a first ink portion surrounding the first core portion, wherein the first ink portion comprises a first inner portion contacting the first core and a first outer portion; extruding a second micro-ribbon, wherein the second micro-ribbon comprises a second core portion and a second ink portion surrounding the second core portion, wherein the second ink portion comprises a second inner portion contacting the second core and a second outer portion; and bond the first micro-ribbon to the second micro-ribbon. The bonding comprises: aligning the first micro-ribbon and the second micro-ribbon under heat, wherein the heat is at a temperature above a melting point of the first outer portion and the second outer portion; and cooling the first micro-ribbon and the second micro-ribbon. The bonding comprises: aligning the first micro-ribbon and the second micro-ribbon; and exposing the first micro-ribbon and the second micro-ribbon to UV light to cure the first micro-ribbon and the second micro-ribbon.

While the foregoing is directed to embodiments of the present disclosure, other and further embodiments of the disclosure may be devised without departing from the basic scope thereof, and the scope thereof is determined by the claims that follow.

What is claimed is:

1. A micro-ribbon structure, comprising:
    an extruded first fiber having a first ink portion; and
    an extruded second fiber having a second ink portion, wherein the first ink portion is bonded to the second ink portion, wherein the first ink portion comprises quantum dots or phosphor material.
2. The micro-ribbon structure of claim 1, wherein the extruded first fiber comprises a first core portion surrounded by the first ink portion, and wherein the extruded second fiber comprises a second core portion surrounded by the second ink portion.
3. The micro-ribbon structure of claim 2, wherein the first ink portion includes a first inner portion contacting the first core portion and a first shell portion surrounding the first inner portion, and wherein the second ink portion includes a second inner portion contacting the second core portion and a second shell portion surrounding the second inner portion.
4. The micro-ribbon structure of claim 2, wherein the first core portion comprises glass, metal, or polymer.
5. The micro-ribbon structure of claim 3, wherein the first shell portion is bonded to the second shell portion.
6. The micro-ribbon structure of claim 1, further comprising an extruded light blocking fiber having a blocking core and a blocking ink portion, wherein the blocking ink portion is bonded to the second ink portion.
7. The micro-ribbon structure of claim 6, wherein the extruded first fiber has first diameter, wherein the extruded light blocking fiber has a blocking diameter, and wherein the first diameter and the blocking diameter are different.
8. The micro-ribbon structure of claim 7, wherein the first diameter is greater than the blocking diameter.
9. The micro-ribbon structure of claim 6, wherein the first ink portion has a first diameter, wherein the blocking ink portion has a blocking ink diameter, and wherein the first diameter and the blocking ink diameter are different.
10. The micro-ribbon structure of claim 9, wherein the first diameter is greater than the blocking ink diameter.
11. The micro-ribbon structure of claim 9, wherein the first diameter is less than the blocking ink diameter.
12. A micro-ribbon structure, comprising:
    an extruded first fiber having a first ink portion; and
    an extruded second fiber having a second ink portion, wherein the first ink portion is bonded to the second ink portion, wherein the first ink portion is bonded to the second ink portion by a light blocking adhesive.
13. A display apparatus comprising a micro-ribbon structure, wherein the micro-ribbon structure is a first micro-ribbon structure, wherein the micro-ribbon structure comprises:
    an extruded first fiber having a first ink portion; and
    an extruded second fiber having a second ink portion, wherein the first ink portion is bonded to the second ink portion.
14. The display apparatus of claim 13, further comprising a second micro-ribbon structure comprising:
    an extruded third fiber having a third ink portion.
15. The display apparatus of claim 14, further comprising an extruded fourth fiber having a fourth ink portion, wherein the third ink portion is bonded to the fourth ink portion, wherein the first ink portion and the second ink portion comprise a first color, wherein the third ink portion and the fourth ink portion comprise a second color, and wherein the first color is different from the second color.
16. The display apparatus of claim 14, further comprising a light blocking fiber having a light blocking ink portion, wherein the first ink portion and the third ink portion are each bonded to the light blocking ink portion.
17. The display apparatus of claim 16, further comprising a first pressure sensitive adhesive, wherein the first micro-ribbon structure, the second micro-ribbon structure, and the light blocking fiber are sandwiched between the first pressure sensitive adhesive and an anti-glare hard coating.
18. The display apparatus of claim 17, wherein the light blocking fiber is in contact with the first pressure sensitive adhesive, and wherein the first micro-ribbon structure and the second micro-ribbon structure are each spaced from the first pressure sensitive adhesive by air gaps.

19. A method of manufacturing a micro-ribbon structure, comprising:
   extruding a first micro-ribbon, wherein the first micro-ribbon comprises a first ink portion, wherein the first ink portion comprises a first inner portion and a first outer portion; and
   extruding a second micro-ribbon, wherein the second micro-ribbon comprises a second ink portion, wherein the second ink portion comprises a second inner portion and a second outer portion, wherein the first ink portion and the first outer portion are extruded in parallel.

20. The method of claim 19, further comprising bonding the first micro-ribbon to the second micro-ribbon.

21. The method of claim 20, wherein the bonding comprises:
   aligning the first micro-ribbon and the second micro-ribbon under heat, wherein the heat is at a temperature above a melting point of the first outer portion and the second outer portion; and
   cooling the first micro-ribbon and the second micro-ribbon.

22. The method of claim 20, wherein the bonding comprises:
   aligning the first micro-ribbon and the second micro-ribbon; and
   exposing the first micro-ribbon and the second micro-ribbon to UV light to cure the first micro-ribbon and the second micro-ribbon.

\* \* \* \* \*